United States Patent Office 3,443,778
Patented May 13, 1969

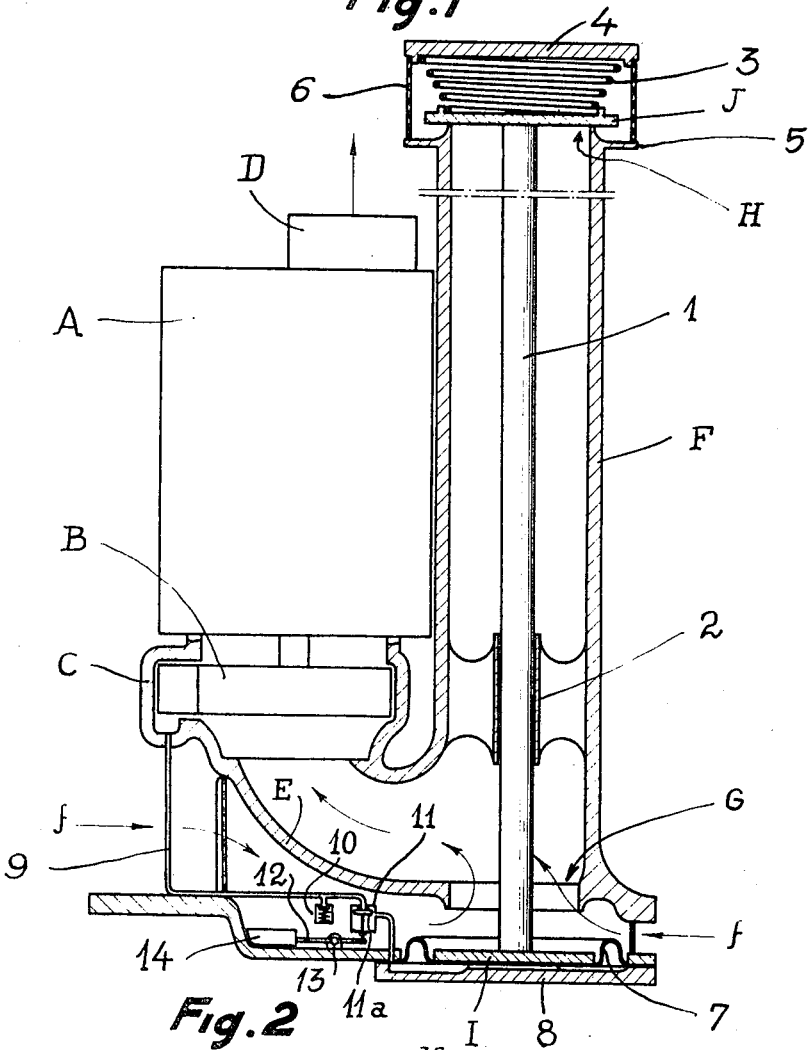

3,443,778
SYSTEMS FOR SUPPLYING FUEL TO AIRCRAFT ENGINES
Robert Sanz, Courbevoie, France, assignor to Intertechnique, Plaisir, Yvelines, France, a French company
Filed June 1, 1967, Ser. No. 642,762
Claims priority, application France, June 6, 1966, 64,262
Int. Cl. B64d 37/00; B67d 5/50
U.S. Cl. 244—135          6 Claims

ABSTRACT OF THE DISCLOSURE

In a system for supplying fuel to aircraft engines from a fuel tank and comprising a fuel pump whose intake communicates with at least two fuel admission orifices located at different points of said fuel tank and inlet valves for controlling said admission orifices, the provision of positive and automatic hydraulic control means actuable under the action of gravity for selectively effecting, on the one hand, the opening of the valve whose function is to open the admission orifice which is submerged in the fuel and, on the other hand, the closure of the valve whose function is to close the admission orifice which is not submerged in the fuel.

---

It is known that some types of aircraft must be equipped with systems for supplying fuel to engines (piston engines, jet engines and the like) wherein said systems must be capable of operating correctly under all conditions of flight of an aircraft, including inverted flight.

In order to achieve ths result, it has already been proposed among other things to draw the fuel from a storage tank by means of two separate pumping units, one unit being intended to draw fuel from the tank during normal flight and the other unit being designed to draw fuel from the tank during inverted flight.

According to another proposed expedient, provision has been made for a special auxiliary vessel known as an "inverted flight accumulator" which is placed inside a storage tank and adapted, on the one hand, to collect a predetermined quantity of fuel during normal flight and, on the other hand, to restore the collected fuel during inverted flight.

The disadvantage of these systems lies in their weight, their complication and consequently in their relatively high cost.

The present invention makes it possible to obtain the desired result by virtue of relatively simple improvements made in a fuel supply system of the type comprising a single submerged fuel pump, the intake side of which is connected by automatic selector means to fuel admission orifices which are located at different points of the same fuel tank.

In the known arrangement of the system referred to above, the selector means comprise two gravity-operated inlet valves for opening and closing at least two orifices (or groups of orifices) according to the prevailing flight conditions. In point of fact, experience has proved that an arrangement of selector means of this type fails to meet the essential requirement of fully reliable operation.

The improvements which form the subject matter of this invention make it possible to circumvent the disadvantages presented by the known arrangement referred to in the foregoing and are primarily distinguished by the fact that the valves which control the fuel admission orifices located at different points of a same fuel tank are not operated under the action of gravity but by positive-control means so arranged that, irrespective of the movements and behaviour of the aircraft, there only remain open those orifices which are submerged in the fuel whilst the orifices which are not submerged in the fuel are closed so as to prevent any admission of air into the pump, said valve being coupled mechanically to each other by a stem and the control system formed by said valves is hydraulically operated by a fraction of the fuel which is delivered under pressure by the supply pump, the hydraulic control system, which is operated in dependence on the flight conditions, comprising at least one flexible-walled chamber interposed between a stationary wall and one of the valves, said chamber being connected to the delivery side of the pump by way of a distributor which is operated under the action of gravity and adapted to put the chamber into communication either with the delivery side of the pump or with a zone which is not subjected to the delivery pressure of said pump, the valve which is remote from the hydraulically operated valve being subjected to the action of restoring means, for example a spring, which work in opposition to the flexible-walled chamber.

The distributor may be a slide valve actuated from a balance weight by means of a rocker-arm.

In a variant, the restoring means consist of a second flexible-walled chamber which is designed in the same manner as the first but which works in opposition to said first chamber and is coupled to the distributor which is common to both chambers, said common distributor comprising a gravity actuated plunger having two ends adapted to form shut-off valves for controlling the admission of liquid delivered from the pump to the two flexible-walled chambers and draining said chambers.

Further properties and advantages of the invention will become apparent from the following description, reference being made to the accompanying diagrammatic drawings, in which:

FIG. 1 is a view in part-sectional elevation of a pumping system comprising fuel-intake orifice selector means, the bottom valve which is controlled by a flexible-walled chamber being open whilst the top valve is closed;

FIG. 2 is a partial view of FIG. 1, the bottom valve being closed whilst the top valve is open;

Figure 3:
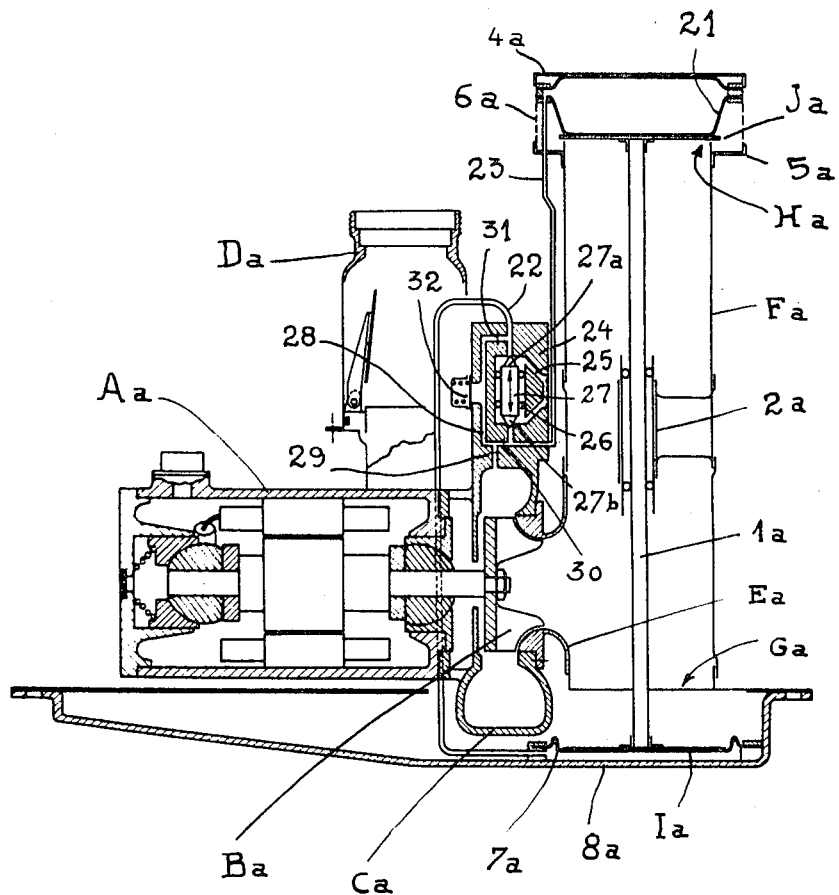
FIG. 3 is a view which is similar to FIG. 1 but drawn to a smaller scale and showing an alternative form in which both valves are each actuated by a flexible-walled chamber.

In FIG. 1, A designates the electric motor which serves to drive the submerged fuel pump. In the example under consideration, said pump is of the centrifugal type and comprises an impeller B surrounded by a spiral collector casing C which discharges into the duct D (leading to the motor to be supplied).

The central zone of the impeller B communicates, through a duct E, with a substantially rectilinear duct F, the two opposite ends of which are arranged as admission orifices G and H provided with valve seats with which the valve discs I and J respectively are adapted to cooperate. This arrangement is already known per se.

In accordance with the invention, the two valves I and J are positively coupled to each other by means of a stem 1 which is slidably fitted in a guide 2, said guide being rigidly fixed to the duct F.

A restoring spring 3 applied against a cap 4 which, in conjunction with an annular flange 5 of the duct F, retains the filter grid 6, normally thrusts back on the one hand the valve J against its seating and, on the other hand, the valve I which thus flattens by compression a flexible diaphragm 7, said diaphragm being designed to constitute in conjunction with a rigid base 8 the flexible-walled chamber X of the hydraulic control system.

The chamber X communicates with the delivery side of the fuel pump, for example with the spiral casing C, by means of a duct 9 in which are interposed a relief valve 10 suitably calibrated to serve as a safety valve, and a slide-valve distributor 11 which is so arranged as to put the chamber X into communication either with a low-pressure fuel admission zone or with the delivery side of the pump. The distributor slide-valve 11a is connected to one end of a rocker-arm 12 which is pivotally mounted at 13, the other end of said rocker-arm being adapted to carry a control balance weight 14.

Under normal flight conditions, all the components are in the positions shown in FIG. 1. In this position, the balance weight 14 is not urged to move away from its rest position in which the distributor 11 is also in the rest position, with the result that the chamber X (which is compressed by the valve I under the action of the spring 3) is not supplied with liquid under pressure but communicates on the contrary with a low-pressure zone. Under these conditions, the fuel is drawn only from the bottom portion of the tank through the bottom orifice G (as shown by the arrow $f$).

During inverted flight or in the case of negative gravity, the balance weight 14 moves away from its rest position (as shown in FIG. 2) and initiates by means of the rocker-arm 12 the action of the slide-valve distributor 11 which then puts the chamber X into communication via the pipe 9 with the delivery side of the pump so as to receive the fuel under pressure. Said fuel then fills said chamber and causes this latter to expand while exerting an upward thrust on the flexible diaphragm 7 which acts against the pressure of the restoring spring 3 and lifts the moving system constituted by the two valves I and J together with their connecting stem 1.

During this movement of the aforesaid moving system, the bottom valve I closes off the bottom admission orifice G whilst the top valve J opens the top admission orifice H. Under these conditions, the fuel is withdrawn only in a higher zone of the fuel tank.

As soon as flight conditions are restored to normal, the balance weight 14 returns to its rest position and the slide-valve distributor 11 re-establishes communication between the chamber X and the low-pressure zone, thereby assisting the draining of said chamber and consequently causing the diaphragm to move down under the action of the thrust exerted by the spring 3 on the moving system I–J–1, and normal flight conditions again prevail.

In the alternative form of FIG. 3, the members which are similar to those of FIGS. 1 and 2 are designated by the same reference numerals followed by the index "a"; it will therefore not be considered necessary to describe in detail the members Aa, Ba, Ca, Da, Ea, Fa, Ga, Ha, Ia, Ja, 1a, 2a, 4a, 5a, 6a, 7a and 8a.

The embodiments of FIG. 3 differs from that of FIGS. 1 and 2 in the closure of the top valve Ja (as is the case with the bottom valve I) is controlled by a flexible-walled chamber 21 which is interposed between the cap 4a and said top valve.

The two flexible-walled chambers 7a and 21 are connected respectively by way of pipes 22 and 23 to a distributor 24 comprising a cavity 25 in which a cylindrical plunger 27 is slidably fitted and guided between balls 26. The two ends of said plunger form closure valve-cones 27a, 27b which control the outlets of the pipes 22 and 23 within the cavity 25, said cavity being adapted to communicate with the interior of the fuel tank.

The two pipes 22 and 23 additionally communicate through a feed pipe 28 with the delivery side of the fuel pump.

Calibrated nozzles disposed at 29, 30 and 31 control the circulation of liquid towards the chambers 7a and 21 and away from these chambers.

Finally, the supply duct 28 is fitted with a safety valve 32.

What I claim is:
1. In a system for supplying fuel from a fuel tank to aircraft engines, comprising a fuel pump whose intake communicates with at least two fuel admission orifices located at different points of said fuel tank and controlled respectively by two inlet valves mechanically coupled to each other by a stem and actuated by a hydraulic control system operated in dependence of the flight conditions of the aircraft and supplied with a fraction of the fuel delivered under pressure by the said fuel pump, said hydraulic control system comprising: at least one flexible-walled chamber which is capable of producing action on one of the valves; a distributor which operates under the action of gravity and interposed between the discharge side of the pump and the said flexible-walled chamber so as to put said chamber into communication either with the discharge side of the pump or with a portion of the supply system which is not subjected to the discharge pressure of said pump; and restoring means adapted to work in opposition to the flexible-walled chamber so as to bring into the closed position the valve located opposite to the valve which is controlled by said chamber.

2. A fuel supply system as claimed in claim 1, wherein said system additionally comprises a safety valve which is mounted upstream of the distributor so as to prevent any overpressure within the hydraulic control system.

3. A fuel supply system as claimed in claim 1, wherein the restoring means consist of a spring which works in compression and which produces action on the valve located opposite to the valve which is operated in dependence on the flexible-walled chamber.

4. A fuel supply system as claimed in claim 1, wherein the distributor comprises a stationary body provided with ducts and a moving slide-valve for controlling the flow towards the ducts.

5. A fuel supply system as claimed in claim 4, wherein said system further comprises a control balance weight and a rocker-arm for operatively connecting said balance weight to the distributor slide-valve.

6. A fuel supply system as claimed in claim 1, wherein the restoring means consist of a second flexible-walled chamber which is designed in the same manner as the first but which works in opposition to said first chamber and is coupled to the gravity operable distributor which is common to both chambers and comprises a plunger operating under the action of the gravity and having two ends which form shut-off valves for controlling the admission of the liquid discharged by the pump to the two flexible-walled chambers and the draining of said chambers.

References Cited
UNITED STATES PATENTS

| | | | |
|---|---|---|---|
| 1,230,423 | 6/1917 | McCaslin | 169—33 |
| 1,551,519 | 8/1925 | Streich et al. | 158—36.3 |
| 1,845,136 | 2/1932 | Dieter | 244—135 |
| 1,921,922 | 8/1933 | Herr | 158—36.1 |
| 2,547,246 | 4/1951 | Aspelin | 244—135 |
| 2,660,384 | 11/1933 | Smith | 244—135 |
| 2,792,974 | 5/1957 | Smith et al. | 222—376 |

MILTON BUCHLER, *Primary Examiner.*

J. E. PITTENGER, *Assistant Examiner.*

U.S. Cl. X.R.

103—2; 222—376